(12) United States Patent
Russo et al.

(10) Patent No.: US 6,478,125 B1
(45) Date of Patent: Nov. 12, 2002

(54) DISK BRAKE PAD FOR RAIL OR UTILITY VEHICLES

(75) Inventors: Sergio Russo, Sabato (IT); Richard Bugaj, Dorsten (DE)

(73) Assignee: Ruetgers Automotive Aktiengesellschaft (DE)

( * ) Notice: Subject to any disclaimer, the term of this patent is extended or adjusted under 35 U.S.C. 154(b) by 0 days.

(21) Appl. No.: 09/744,770

(22) PCT Filed: Jul. 26, 1999

(86) PCT No.: PCT/EP99/05321

§ 371 (c)(1), (2), (4) Date: Apr. 9, 2001

(87) PCT Pub. No.: WO00/06923

PCT Pub. Date: Feb. 10, 2000

(30) Foreign Application Priority Data

Jul. 25, 1998 (DE) .......................... 198 33 628
Nov. 21, 1998 (DE) .......................... 198 53 828

(51) Int. Cl.⁷ .............................................. F16D 69/04
(52) U.S. Cl. .............................. 188/250 E; 188/250 B; 188/250 G
(58) Field of Search .......................... 188/250 E, 250 B, 188/250 G

(56) References Cited

U.S. PATENT DOCUMENTS

| | | | | | |
|---|---|---|---|---|---|
| 5,538,108 A | * | 7/1996 | Russo | .................... | 188/250 B |
| 5,730,257 A | * | 3/1998 | Clark | .................... | 188/250 E |
| 5,934,418 A | * | 8/1999 | Wirth | .................... | 188/250 E |

* cited by examiner

Primary Examiner—Matthew C. Graham
(74) Attorney, Agent, or Firm—Blakely Sokoloff Taylor & Zafman

(57) ABSTRACT

Several long friction bodies (31 ... 37) each with several rivets (4), are fixed to the anchor plate of a disk brake pad (1) for rail or utility vehicles. The peripheral profile of each friction body is configured in the shape of a stadium so that the two semi-circle-shaped ends are each connected by parallel sides. The fixing rivets (4) are arranged at a mutual distance in the direction of the greatest longitudinal extension of the corresponding friction body (L1 .... L7). The directions of all of the greatest longitudinal extensions are at an acute angle α to the run-in direction (E). The angles incidence (α) are different for the various friction bodies of the friction body arrangement but are never greater than 45°.

12 Claims, 2 Drawing Sheets

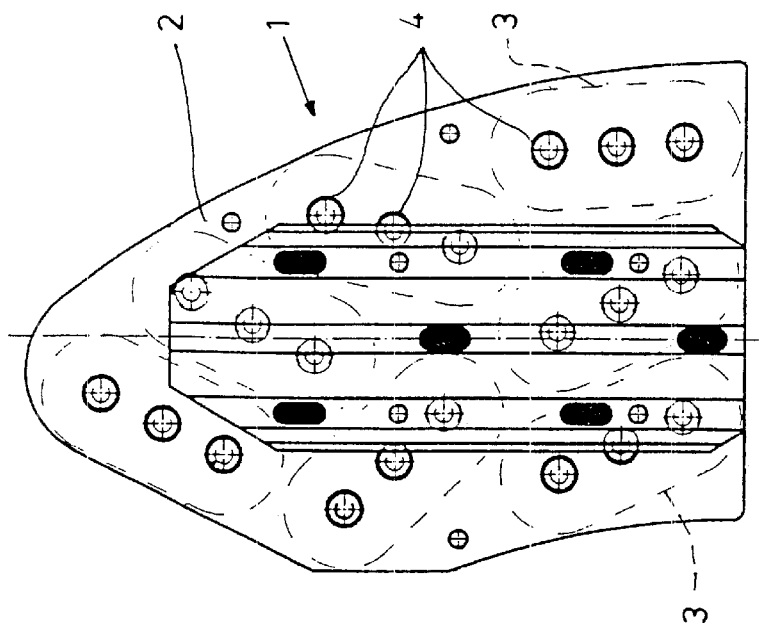
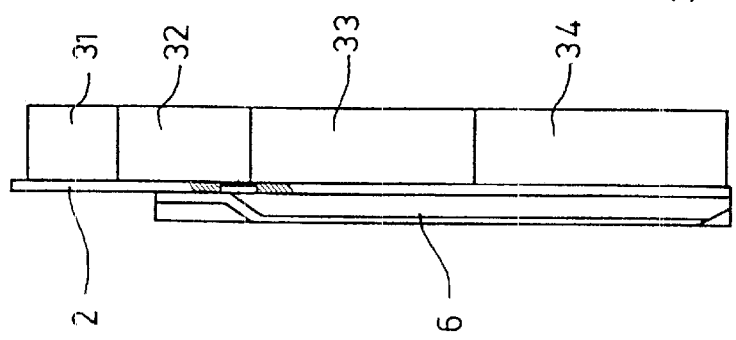
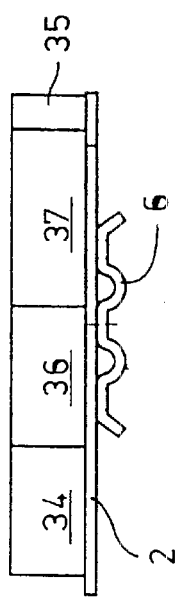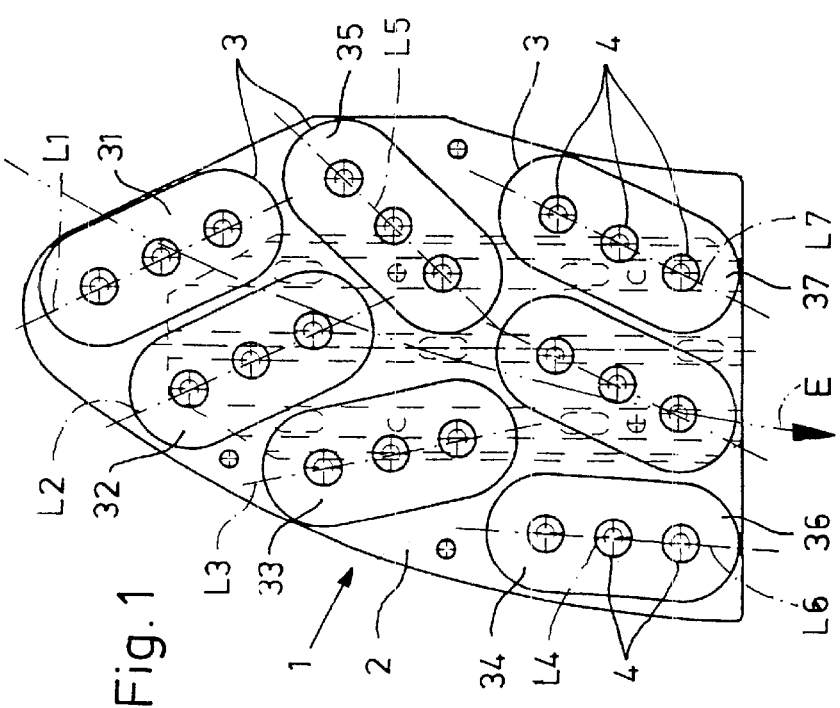

DISK BRAKE PAD FOR RAIL OR UTILITY VEHICLES

The invention relates to a disk brake pad for rail or utility vehicles including an anchor plate and a plurality of frictional bodies secured to the anchor plate.

Disk brakes are highly loaded components of vehicles. They must in part decelerate considerable masses and bring them to rest within the shortest possible time. By reason of their high weight, rail and utility vehicles require high braking moments, which must be transmitted by the brake pads.

Good transmission of the braking force from the disk brake pad to the brake disk is necessary for an effective braking process. It has transpired that large area frictional bodies can transmit particularly large braking moments to the brake disk. There is, however, the risk in the wet that such frictional bodies can no longer develop the same braking action as in the dry. People refer also to "wet fading".

Better wet running properties are obtained if the brake pads are divided into a plurality of smaller frictional bodies. Cylindrical frictional bodies are known from DE-C 19727705 which are welded or riveted to the anchor plate. The frictional bodies of this known frictional body arrangement are connected only at discrete points, for instance by means of a central rivet, to the anchor plate. As a result of the high braking moments and lever forces, such point connections can come free, in operation. This results in a reduction of the available braking capacity and, under certain circumstances, destruction of the entire brake disk. The better wet running properties of known multi-element brake pads were thus at the expense of the stability of these pads.

It is the object of the invention to provide a brake pad whose effectiveness is independent of the weather and which may be economically manufactured and has a good stability.

DE-29508322 U discloses a brake pad for disk brakes for rail vehicles in which at least one block of a pressed frictional material is secured to a carrier plate. Disposed between the frictional material block and the carrier plate is an intermediate metallic plate constituting a riveting base. The frictional material block is fastened to the wall surface, remote from the carrier plate, of the intermediate plate by means of mechanical or non-mechanical connecting means. Large area intermediate plates are connected to the carrier plate with a plurality of rivets; with large subdivision of the frictional bodies and relatively small intermediate plates only one respective rivet is provided. The use of the intermediate plates serves the purpose of making reuse of the carrier plate possible, notwithstanding the use of rivet connections, with good economical usage of the frictional material. Improvement of the wet running characteristics is neither sought therein nor achieved.

U.S. Pat. No. 5,538,108 discloses another disk brake pad for rail or utility vehicles in which a plurality of cylindrical or polygonal pad elements are mounted by means of a respective central point connection on a resilient arm of an intermediate plate. The latter is secured to a pad carrier.

It is the object of the invention to provide a brake pad whose effectiveness is independent of the weather and which may be economically manufactured and has a good stability.

A first solution to this object resides in accordance with the invention in the features of claim 1.

A second solution to the said object resides in accordance with the invention in the features of claim 7

The invention will be described below with reference to exemplary embodiments illustrated in the drawings, in which:

FIG. 1 is a plan view of a first exemplary embodiment of a disk brake pad in accordance with the invention;

FIG. 2 is a first side view;

FIG. 3 is a second side view;

FIG. 4 is a view from below of the first exemplary embodiment;

Figure 5:
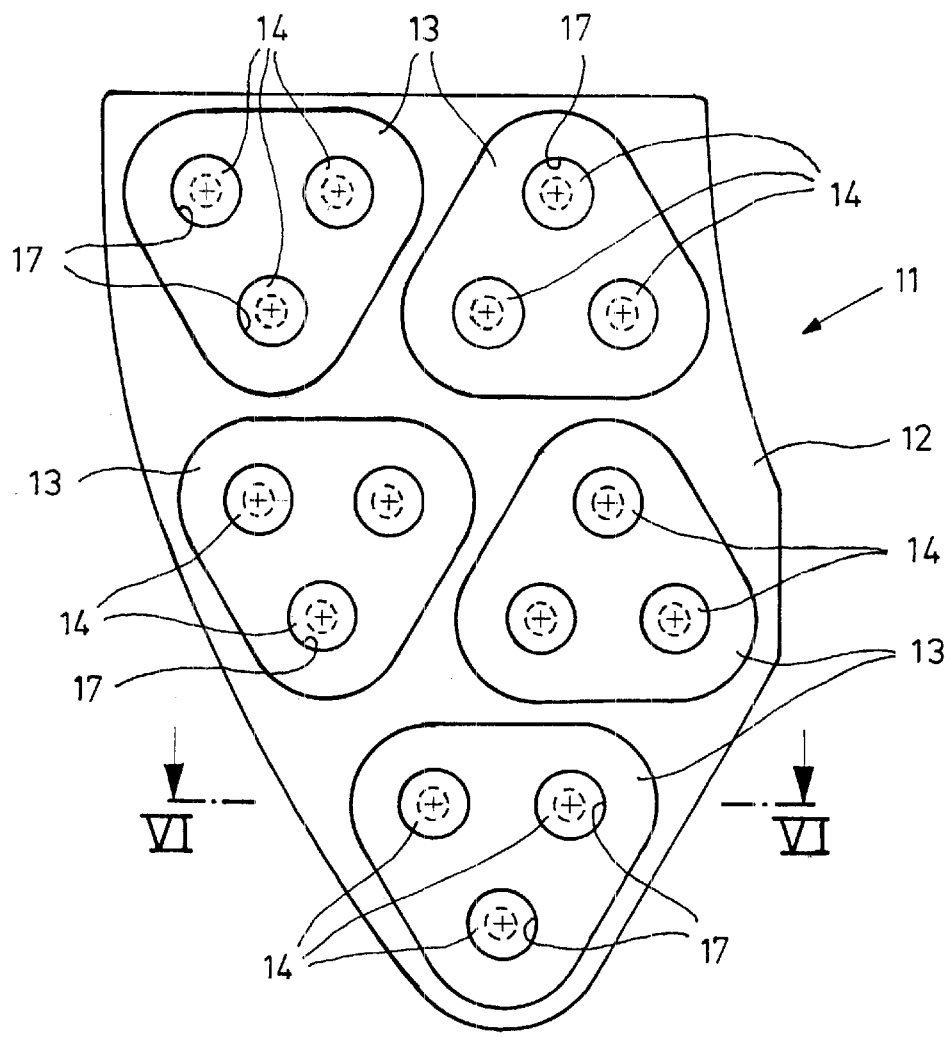
FIG. 5 is a schematic plan view of a second exemplary embodiment of the disk brake pad in accordance with the invention.

In the exemplary embodiment shown in FIGS. 1–4, the disk brake pad 1 has an anchor plate 2 and a coplanar arrangement of seven frictional bodies 3, which are each fastened to the anchor plate 2 with three rivets 4. In the described exemplary embodiment, each frictional body 3 comprises a container with a stadium-shaped elongate peripheral profile. Pressed into the container is a suitable frictional material. The frictional material is omitted in the drawings in order to permit the rivets fixing the frictional bodies to the anchor plate to be seen.

Secured to the rear surface of the anchor plate 2 remote from the friction pad surface is a swallowtail 6, with the aid of which the brake pad 1 is fixed to a brake pad mounting, which is not shown in the drawing.

The directions of the major longitudinal extent L1 ... L7 of the seven frictional bodies 31 ... 37 in all are disposed in FIG. 1 at an acute angle to an entry direction E shown with a chain dotted line. The pitch angle α of the frictional body 31 is shown in FIG. 1. The elongate and stadium-shaped frictional bodies 3 have in part different pitch angles with respect to the entry direction E. The pitch angle of the frictional bodies 31 and 32 are approximately the same. The pitch angle of the frictional body 33 is more acute and the pitch angle of the frictional body 34 is even more acute. The pitch 30 angles of the frictional bodies 35, 36 and 37 are also acute but are situated in another quadrant, i.e. the directions L5 ... L7 of the greatest longitudinal extent of the frictional bodies 35–37 are inclined at an acute angle to the other side of the entry direction E. In each case, the angle a. is smaller than or at most equal to 45°. As a result of this oblique positioning of the individual frictional bodies 3 with respect to the entry direction E, relatively uniform braking distribution and wear of the coplanar braking surfaces are produced and thus excellent braking effects. The wet running characteristics are significantly improved in comparison to conventional multi-element brake pad arrangements. The number of the frictional bodies is small for multi-element brake pads so that the manufacture and connection of the frictional bodies 31 to 37 are economical.

Every individual brake body is connected to the anchor plate 2 by means of three rivets 4. All three rivets 4 are arranged on the axis of the greatest length of the associated frictional body 3. The frictional body is thus reliably and uniformly mounted on the anchor plate 2 and the risk of a rivet connection or even all the rivet connections of a frictional body coming loose and shearing off is minimised.

Instead of the stadium-shaped shape of the peripheral profile, a different elongate profile of the frictional bodies can be used. Oval, prismatic or polygonal profiles are possible. However, the stadium-shape of the peripheral profile ensures simple manufacture and excellent wet running characteristics. Another favourable peripheral profile shape would be a parallelogram with angles which are not right angles. In the described exemplary embodiment the ratio of length:breadth of the frictional bodies is about 2:1; depending on the application different cross-sectional ratios, e.g. between 1.2:1 and 2.2:1 and more, can be convenient.

Figure 6:
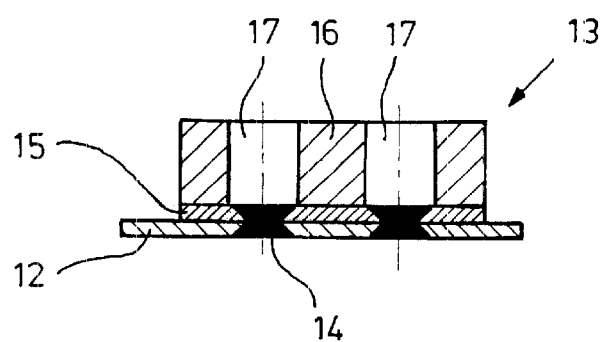
FIG. 6 is a sectional view on the section line VI—VI in FIG. 5.

Another exemplary embodiment of a disk brake pad 11 is illustrated in FIGS. 5 and 6. The disk brake pad 11 has an anchor plate 12 of similar construction to that in the previously described exemplary embodiment and a coplanar arrangement of five frictional bodies 13, each of which is fastened to the anchor plate 12 with three rivets 14. Each frictional body has a polygonal, particularly triangular, peripheral profile with rounded corners. All three sides have the same length and are disposed with respect to one another at angles of 60° in the manner of an equilateral triangle. The triangular frictional bodies 13 are, as shown in FIG. 5, arranged at close spacings from one another such that the gaps are maintained relatively small. This has the result that the effective braking surfaces take up a large percentage of the area of the anchor plate 12, despite the separation of the frictional bodies. The arrangement of the frictional bodies 13 with a triangular peripheral profile shown in FIG. 5 has similarly good wet running properties to the arrangement of the frictional bodies 3 in the first exemplary embodiment and just as high a stability since each frictional body is fastened to the anchor plate 12 with three rivets 14 in this case also.

As shown in FIG. 6, each frictional body 13 has a base plate 15, to which the frictional material 16 is secured. The frictional material layer 16 is provided with bores 17 in alignment with the rivets 14 in order to be able to install the rivets 14 with suitable riveting tools. The frictional material layer 16 can, however, also be arranged in a container integral with the base plate 15, the peripheral shape of which corresponds to the illustrated peripheral shape of the frictional body 13.

Instead of an equilateral triangle, other polygonal peripheral shapes can also be provided, including triangular peripheral profiles with side surfaces of different lengths. The number and design of the sides can be matched to the shape of the carrier plate. They should, however, be so selected for reasons of economy that all the frictional bodies have identical peripheral profiles and simple and large scale manufacture is thus possible.

Numerous modifications of the exemplary embodiment shown in the drawings are possible within the scope of the inventive concept. The number and precise peripheral shape and construction of the frictional bodies can be matched to the application in question and the other edge parameters. Each frictional body can also be installed on a base plate which is itself secured in turn to the anchor plate by suitable means. The mounting of a one-piece frictional body directly on or to the anchor plate 2 is also possible. The nature of the connection of the frictional body itself to the anchor plate is also not limited to the illustrated arrangement of rivets; other form-locking connections are also possible, for instance the pressing of a carrier composition connected to the frictional body into matching openings in the anchor plate. The rivet arrangement, however, currently constitutes the simplest type of fastening which also guarantees favourable assembly and manufacture.

What is claimed is:

1. A disk brake pad for rail and utility vehicles comprising;
    an anchor plate;
    a plurality of frictional bodies composed at least in part of a frictional material; and
    a number of rivets at least two of said rivets connecting each of said frictional bodies to said anchor plate,
    said plurality of frictional bodies each having a frictional surface and an opposite fastening surface facing to said anchor plate,
    said plurality of frictional bodies each having at least two bores through said frictional material which are open towards said frictional surface so as to permit a suitable riveting tool to be applied for riveting each of said frictional bodies to said anchor plate.

2. The disk brake pad of claim 1 wherein each of said plurality of frictional bodies having an elongate peripheral profile having a longitudinal direction, said longitudinal direction being disposed at an acute angle with respect to an entry direction of said disk brake pad, wherein $0<\alpha \leq 45°$.

3. The disk brake pad of claim 2, wherein the peripheral profiles of the frictional bodies are stadium-shaped with two parallel side walls and rounded end walls.

4. The disk brake pad of claim 2, wherein the frictional bodies have an oval peripheral profile.

5. The disk brake pad of claim 2, wherein each frictional body is fastened to the anchor plate by means of three rivets arranged in its longitudinal direction.

6. The disk brake pad of claim 2, wherein the longitudinal directions of the frictional bodies are disposed at least in part at different acute angles to the entry direction.

7. The disk brake pad of claim 6, wherein said frictional bodies are at least in part disposed on different sides of said entry direction.

8. The disk brake pad of claim 1, wherein each of said frictional bodies has a polygonal peripheral profile with rounded corners and wherein each of said frictional bodies being directly connected to said anchor plate by at least two rivets.

9. The disk brake pad of claim 8, wherein each frictional body has a peripheral profile of an equilateral triangle and is connected to the anchor plate by means of three rivets disposed at equal mutual spacings.

10. A disk brake pad for rail and utility vehicles, comprising;
    an anchor plate;
    a plurality of frictional bodies composed at least in part of a friction material; and
    a number of rivets at least two of said rivets connecting each of said frictional bodies to said anchor plate through the friction bodies material;
    said plurality of frictional bodies having an elongated peripheral shape with a maximum extension in a longitudinal direction, said longitudinal direction being disposed at an acute angle $\alpha$ with respect to an entry direction of said disk brake pad, wherein $0<\alpha \leq 45°$.

11. The disk brake pad of claim 10, wherein the peripheral shapes of the frictional bodies are stadium-shaped with two parallel side walls and rounded end walls, and wherein each of said frictional bodies is fastened to the anchor plate with three rivets arranged in a plane which is disposed substantially in said longitudinal direction.

12. The disc brake pad of claim 11, wherein the ratio of the maximum extension to the space between the two parallel side walls is in the range of 1.2–2.2.

* * * * *